US009488141B2

(12) United States Patent
Tomlinson et al.

(10) Patent No.: US 9,488,141 B2
(45) Date of Patent: Nov. 8, 2016

(54) DEMAND VALVE

(71) Applicants: PARKER-HANNIFIN CORPORATION, Cleveland, OH (US); BLUESKIES INTERNATIONAL LLC, St. Charles, IL (US)

(72) Inventors: Samuel J. Tomlinson, Madison Heights, VA (US); Marvin Peplow, Bartlett, IL (US); Chris Brown, Rockledge, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1084 days.

(21) Appl. No.: 13/624,259

(22) Filed: Sep. 21, 2012

(65) Prior Publication Data

US 2013/0087125 A1 Apr. 11, 2013

Related U.S. Application Data

(60) Provisional application No. 61/545,348, filed on Oct. 10, 2011.

(51) Int. Cl.
*F16K 31/12* (2006.01)
*F02M 37/00* (2006.01)

(52) U.S. Cl.
CPC ..... *F02M 37/0023* (2013.01); *Y10T 137/7836* (2015.04)

(58) Field of Classification Search
CPC ..................... F02M 37/0023; F02M 37/0029; Y10T 137/7836; Y10T 137/7781; Y10T 137/7787; Y10T 137/7826; Y10T 137/783; Y10T 137/7828; Y10T 137/7752; Y10T 137/7753; F16K 1/16; F16K 13/02; G05D 16/063; G05D 16/0675; G05D 16/0686
USPC .................................................. 137/483, 484
See application file for complete search history.

(56) References Cited

U.S. PATENT DOCUMENTS

| | | | | |
|---|---|---|---|---|
| 3,056,424 A * | 10/1962 | Courtot | G05D 16/0686 137/116.5 |
| 3,371,658 A | 3/1968 | Turner | |
| 3,741,240 A * | 6/1973 | Berriman | F02M 69/20 123/512 |
| 3,948,589 A | 4/1976 | DuBois | |
| 4,542,726 A | 9/1985 | Baltz et al. | |
| 4,735,752 A | 4/1988 | Negethon | |
| 4,745,904 A * | 5/1988 | Cagle | F02M 37/0029 123/512 |

(Continued)

OTHER PUBLICATIONS

Fuel Demand Valve, Safe Management of Pressurized Fuel System, © 2010 Attwood Corporation.

(Continued)

*Primary Examiner* — Jessica Cahill
(74) *Attorney, Agent, or Firm* — Renner, Otto, Boisselle & Sklar, LLP

(57) ABSTRACT

A fuel system 10 includes a fuel tank 11, a demand valve 12, a primer pump 13, and an internal combustion engine 14. The demand valve 12 closes and prevents fuel flow to the engine and potential fuel spillage when the engine is not running, even if a positive pressure condition exists in the fuel tank 11. The demand valve 12 is opened to allow fuel flow to the engine 14 only when the engine is to be started or is running. This opening of the demand valve is caused by a vacuum in a central cavity 31 of the demand valve 12. The vacuum causes a diaphragm 43 to move laterally and act through a connector 44 against a pin 39 connected to a valve member 37, to tilt or rotate the valve member 37 relative to a valve seat 34.

15 Claims, 5 Drawing Sheets

(56) References Cited

U.S. PATENT DOCUMENTS

| | | | | |
|---|---|---|---|---|
| 5,970,935 | A | 10/1999 | Harvey et al. | |
| 6,505,640 | B1 * | 1/2003 | Lin | G05D 16/0686 137/315.05 |
| 2005/0166969 | A1 * | 8/2005 | Olds | G05D 16/0686 137/505.46 |
| 2006/0065307 | A1 * | 3/2006 | Schmidt | G05D 16/02 137/505.46 |
| 2011/0083771 | A1 | 4/2011 | Whelan et al. | |

OTHER PUBLICATIONS

You're Headed Into Uncharted Waters, You Don't Have to Go It Alone, EPA 40 CFR Compliance 2011, Attwood®.

Fuel Demand Valve, 9300FDV Fuel Demand Valve with No Siphon, Attwood Marine web page. Applicants request the Examiner to consider this reference as prior art under 102(a).

Sketch of Attwood Fuel Demand Valve. Applicants request the Examiner to consider this reference as prior art under 102(a).

Three photograph pages of Beer Aspirator Valve. Applicants request the Examiner to consider this reference as prior art under 102(a).

Two web pages accessed Apr. 23, 2012 showing Propane Demand Valve. Applicants request the Examiner to consider this reference as prior art under 102(a).

* cited by examiner

DEMAND VALVE

CROSS REFERENCE TO RELATED APPLICATIONS

The present application claims the benefit of the filing date of U.S. Provisional Patent Application Ser. No. 61/545,348 filed Oct. 10, 2011, the disclosure of which is incorporated herein by reference in its entirety.

TECHNICAL FIELD

This invention relates to a valve for controlling fluid flow. More specifically, this invention relates to such a valve that is normally closed and that opens in response to a negative downstream pressure condition. Still more specifically, this invention relates to such a valve that is referred to as a demand valve and used with fuel tanks for internal combustion engines.

BACKGROUND OF THE INVENTION

Fuel tanks used to provide fuel for internal combustion engines may under some conditions have a positive internal pressure. This can occur, for example, when the fuel tank is filled with liquid fuel at a relatively lower temperature and the temperature of the tank and its contents then increases such as by exposure of the fuel tank to a warmer ambient temperature and/or to sunlight. Since the liquid fuel and the fuel vapors in the tank will seek to expand as their temperature increases, this expansion may increase the positive internal pressure in the fuel tank.

If the fuel tank is connected by a fuel supply line to an internal combustion engine, it is desirable to prevent fuel and/or fuel vapors in the tank under this positive pressure condition from flowing to the engine and potentially contaminating the environment when the engine is not operating. Prior art valves for this purpose are provided in the fuel supply line. These valves are spring biased to a normally closed position and prevent fuel and/or fuel vapor under positive pressure from flowing from the fuel tank through the valve when the engine is not operating.

When the engine is to be started, the normally closed valve is opened in response to a demand for fuel to allow fuel to be supplied to the engine from the fuel tank. The valve is referred to as a demand valve and is opened by a negative pressure (or vacuum) condition that is applied to the downstream side of the valve during starting and during operation of the engine. Fuel then flows through the opened valve to the engine. To apply the negative pressure condition to the downstream side of the demand valve before starting the engine, a primer bulb or other pumping device is provided in the fuel supply line between the demand valve and the engine. Operation of the priming bulb creates a negative pressure on the downstream side of the priming bulb to open the demand valve and allow fuel flow to the engine. As the engine is turned to start it and after it is started, the engine continues to create the negative pressure condition on the downstream side of the demand valve to keep the demand valve opened. When the engine is stopped, the negative pressure on the demand valve is abated or no longer applied and the demand valve again closes to prevent fuel flow to the engine until the demand valve is reopened by the primer bulb. Valves of this general type that minimize fuel and/or fuel vapor leakage from fuel tanks are currently required in the United States for certain marine applications, to minimize escape of fuel and/or fuel vapors from the tank when its associated engine is not running.

SUMMARY OF THE INVENTION

The present invention provides a normally closed valve that is opened in response to a downstream pressure condition. More specifically, the invention provides such a valve that is spring biased to a closed position and that remains closed even when fluid pressure is applied to the inlet side of the valve. The valve according to the invention opens in response to a negative or reduced downstream pressure condition that indicates a demand for fluid flow, and the valve remains opened as long as the demand continues. The valve is used in a marine fuel system to minimize or prevent leakage of fuel and/or fuel vapors from a portable marine fuel tank then the associated engine is not running.

The valve comprises a valve body having a longitudinal axis and a valve member arranged for movement in the body to open and close flow passages. The valve member has a first or closed position, and a spring biases the valve member to the closed position. The valve further comprises an actuator arranged for lateral movement in the body. The actuator has a first position when the valve member is in its closed position, and the actuator moves in a lateral direction from its first position to a second position in response to a negative or reduced pressure downstream of the valve. The movement of the actuator to its second position causes the valve member to move laterally or tilt or rotate to a second or opened position to allow fluid flow through the valve.

The invention further provides various ones of the features and structures described above and in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
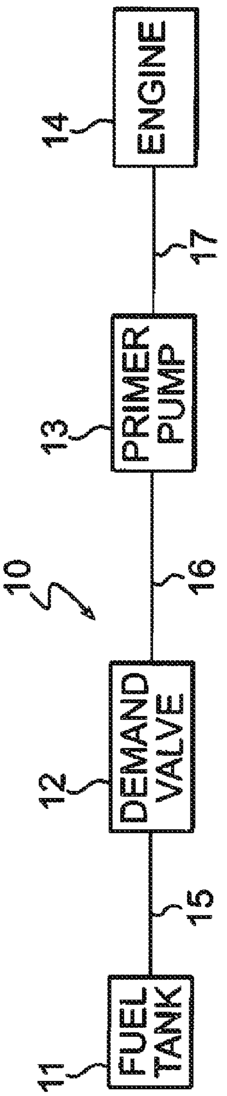
FIG. 1 illustrates a fuel system for an internal combustion engine.
Figure 2:
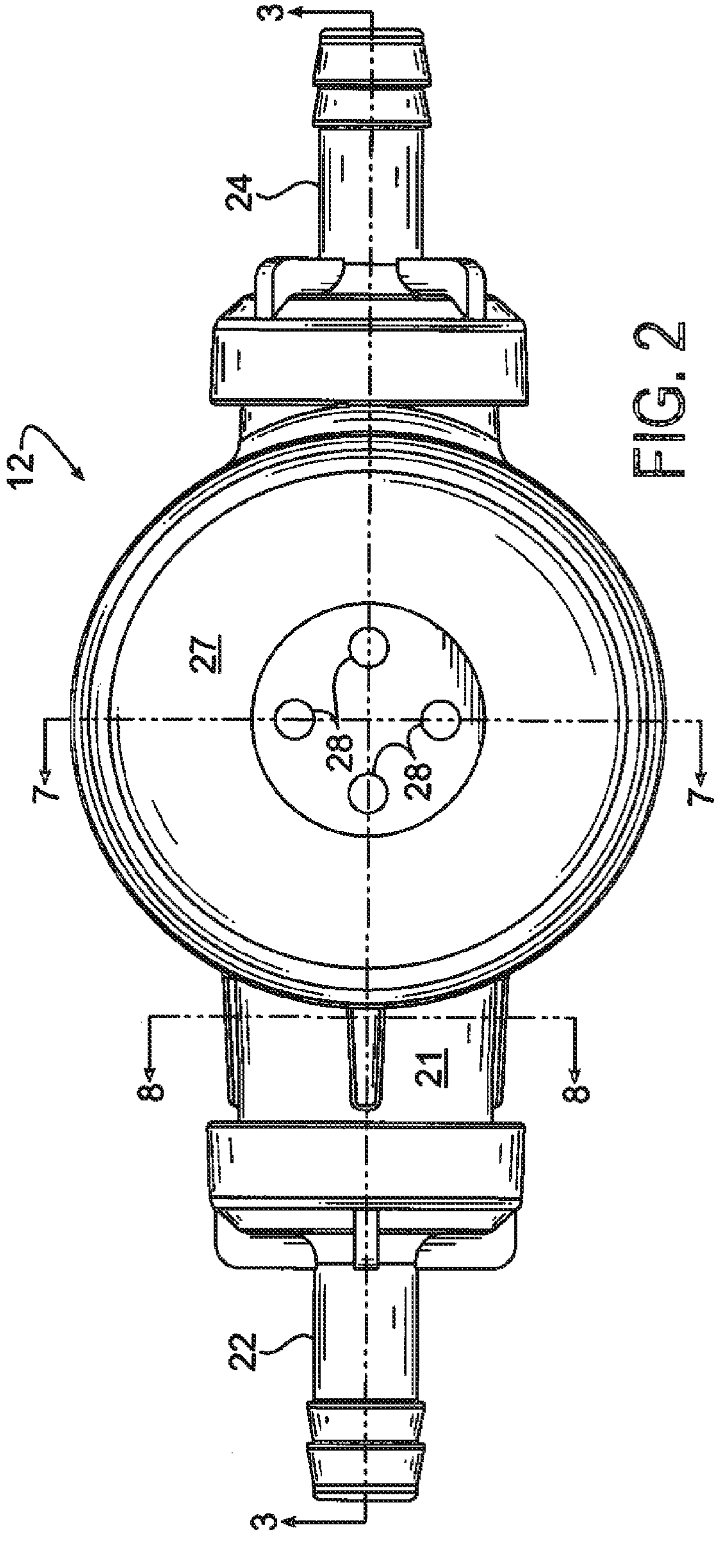
FIG. 2 illustrates a top elevation view of a demand valve according to a preferred embodiment of the present invention, used in the fuel system of FIG. 1.

Referring now to the drawings in greater detail, FIG. 1 illustrates an internal combustion engine fuel system 10. The system 10 includes a fuel tank 11, a demand valve 12, a primer pump 13, and an internal combustion engine 14 connected by fuel lines 15, 16 and 17. The fuel tank 11 may be any suitable tank for receiving, storing and delivering liquid fuel, and in the preferred embodiment the fuel tank 11 is a conventional fuel tank used for a marine application. The engine 14 may be any suitable internal combustion engine, and in the preferred embodiment the engine 14 is a conventional marine engine located on a boat. The primer pump 13 may be any conventional primer pump, and in the preferred embodiment the primer pump 13 is a conventional elastomeric bulb type pump. To prime the engine 14 with fuel for starting, the known bulb type pump 13 is squeezed by an operator to diminish the internal volume of the bulb (not shown) and force fuel out of the bulb through fuel line 17 to the engine 14. During the squeezing of the bulb, a first check valve (not shown) opens to permit fuel within the bulb to flow to fuel line 17 and a second check valve (not shown) closes to prevent fuel within the bulb from flowing to fuel line 16. The bulb expands when released by the operator to increase the internal volume of the bulb and create a vacuum or negative or reduced pressure level in the bulb and in the fuel line 16. During this expansion if the bulb, the first check valve closes to prevent fuel within the line 17 from flowing back into the bulb and the second check valve opens to permit the negative pressure in the bulb to pull fuel through the fuel line 16 and demand valve 12 from the fuel line 15 and tank 11. The primer pump 13 is used in this known manner to supply or prime fuel to the engine 14 immediately prior to and during starting of the engine 14. After the engine 14 starts, the intake vacuum created by the running engine 14 continues to apply a vacuum or negative or reduced pressure to the fuel line 17, primer pump 13, fuel line 16, demand valve 12, and fuel line 15 to continue to draw required fuel from the tank 11 to the engine 14. While the valve 12 in the preferred embodiment is used with a portable marine fuel tank 11, other uses of the valve 12 are within the scope of this invention.

Referring now to FIGS. 2-8, the valve 12 according to a presently preferred embodiment is illustrated. The valve 12 has a longitudinal axis 19 and includes a generally round or cylindrical shaped valve housing 21 that provides a flow passage extending from the fuel line 15 to the fuel line 16. An inlet connector 22 is fixed on an inlet end 23 of the housing 21 and is connected to the fuel line 15 in a known manner. An outlet connector 24 is fixed on an outlet end 25 of the housing 21 and is similarly connected to fuel line 16. The top portion of the housing 21 includes a generally circular opening 26 that receives a closure piece 27. The closure piece 27 includes through holes 28. The housing 21, inlet connector 22, outlet connector 24 and closure piece 27 may be of any suitable material, and in the preferred embodiment these components are of acetal copolymer.

The housing 21 includes a central chamber 31 between the inlet end 23 and the outlet end 25. A lateral wall 32 separates the inlet end 23 of the housing 21 from the central chamber 29, and flow passages **33*a*, 33*b* and 33*c* (FIG. 8) extend through the wall 32. The flow passage 33*a* is oval or slot shaped, with the greater dimension of the oval or slot located in the plane illustrated in FIG. 3 and with the greater dimension being more than about four times the minor dimension. The flow passages 33*b* and 33*c* are each semicircular and are disposed on each side of the slot shaped passage 33*a*. The wall 32 provides a valve seat 34 surrounding the passages 33*a*, 33*b* and 33*c*, and a valve member assembly 35 is arranged to close and open the passages 33*a*, 33*b* and 33*c*. A tapered or cone shaped housing portion 36 is arranged to the left of the wall 32**.

Still referring to FIGS. 2-8, the valve member assembly 35 includes a valve member 37, a head portion 38, a pin 39, and a spring 41. The valve member 37 includes a generally flat lateral surface facing toward the lateral wall 32 and an annular longitudinally projecting circular valve member surface **37*a* facing the lateral wall 32 and encircling the passages 33*a*, 33*b* and 33*c*. The configuration of the passages 33*a*, 33*b* and 33*c* provides a large lateral cross sectional flow area and a large fuel flow capacity for the demand valve 12. The lateral cross sectional area of the slot passage 33*a* is at least about three times the lateral cross sectional area of the pin 39, so that the pin does not substantially block fuel flow through the passage 33*a*. The total cross sectional area of the flow passages 33*a*, 33*b* and 33*c* is greater than about 50% and preferably greater than about 70% of the area within the circular valve surface 37*a* and its associated valve seat 34, to enhance this flow capacity of the valve 12. The valve member 37 is of any suitable material, and in the preferred embodiment the valve member 37 is of a polymeric material such as viton that is resilient and resistant to adverse effects of exposure to hydrocarbon fuels. When the valve 12 is in the position illustrated in FIG. 3, the annular valve member surface 37*a* of the valve member 37 engages and seals against the valve seat 34 at a location laterally outward of and surrounding the passages 33*a*, 33*b* and 33*c* to close the passages 33*a*, 33*b* and 33*c* and prevent flow of fluid through the valve 12. The head portion 38 is of any suitable material, and in the preferred embodiment the head portion 38 is of a polymeric material that is substantially more rigid that the material of the valve member 37 such as nylon that is resistant to adverse effects of exposure to hydrocarbon fuels. The pin 39 is generally cylindrical and is molded into the head portion 38 so that the valve member 37, head portion 38 and pin 39 move together as a unit. The pin 39 is of any suitable material, and in the preferred embodiment the pin is of stainless steel material. The spring 41 is also preferably of stainless steel material and biases the valve member 37 toward its closed position illustrated in FIG. 3**.

Figure 7:
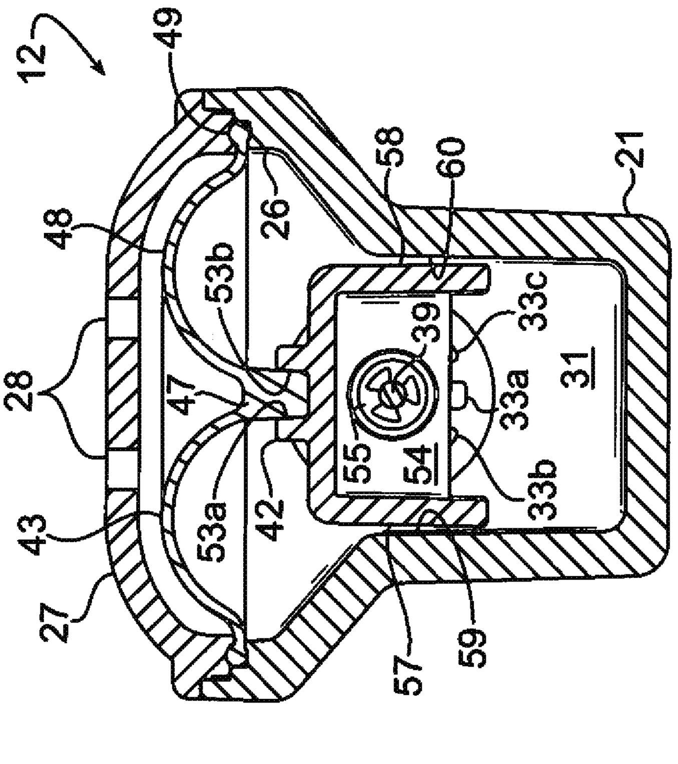
FIG. 7 illustrates a cross sectional view taken along reference view line 7-7 in FIG. 2, with the demand valve in its first or closed position.

The valve 12 further includes an actuator 42 that opens the valve member 37 when the central chamber 31 is exposed to a negative pressure or vacuum or reduced pressure, such as by the above described operation of the primer pump 13 when the engine 14 is to be started. The actuator 42 includes a flexible diaphragm 43 and a connector 44. The diaphragm 43 has a longitudinal axis 45, and the longitudinal axis 45 is arranged at an angle 46 (FIG. 3) of greater than 10 degrees and preferably about 90 degrees relative to the axis 19. The diaphragm 43 includes a central lug 47, a flexible portion 48, and an outer peripheral portion 49 that is captured and sealed between the housing 21 and the closure piece 27. The diaphragm 43 is of any suitable material, and in the preferred embodiment the diaphragm 43 is of viton. The connector 44 includes a first connector portion 53 that movably engages the central lug 47 of the diaphragm 43. The first connector portion 53 is formed with two oppositely facing walls **53*a* and 53*b* as best shown in FIG. 7, and the lug 47 is disposed in the longitudinal slot between the walls 53*a* and 53*b*** for pivoting and sliding contact with the first connector portion 53. The connector 44 further includes a second connector portion 54 that movably engages the valve member pin 39 with sliding contact. The second connector portion 54 includes walls of a hole, and the pin 39 is received within the second connector portion hole. A retaining clip 55 is arranged on the pin 39, and the connector 44 is biased against the retaining clip by the spring 41.

Under all operating conditions, the pressure on the top of the diaphragm 43 is at atmospheric or positive or ambient pressure, and this pressure is referred to as reference pressure. When the central chamber 31 of the valve 12 is also at reference pressure, such as when the engine 14 is not operating and no fluid or fuel is flowing through the valve 12, the pressures on the top and the bottom of the diaphragm 43 are equal. Under this condition, the spring 41 retains the valve member 37 in its closed position illustrated in FIGS. 3 and 4 and the actuator 42 is in a first or at rest position. In this condition, the inlet connector 22, inlet end 23, valve assembly 35 (including valve member 37 and pin 39), central chamber 31, outlet end 25 and outlet connector 24 are each co-axially arranged along their longitudinal axis 19 or substantially parallel to the axis 19. In the event the pressure in the fuel tank 11 increases to a greater positive pressure than the pressure in the demand valve central chamber 31, the spring 41 retains the valve member 37 in this closed position and the positive pressure in the fuel tank 11 and fuel line 15 act on the valve member 37 in a direction to maintain the valve member 37 in this closed position. In this manner, the demand valve 12 prevents escape of fuel and/or fuel vapor from the fuel tank 11 when the engine 14 is not running and the fuel tank 11 encounters a positive pressure condition.

Figure 3:
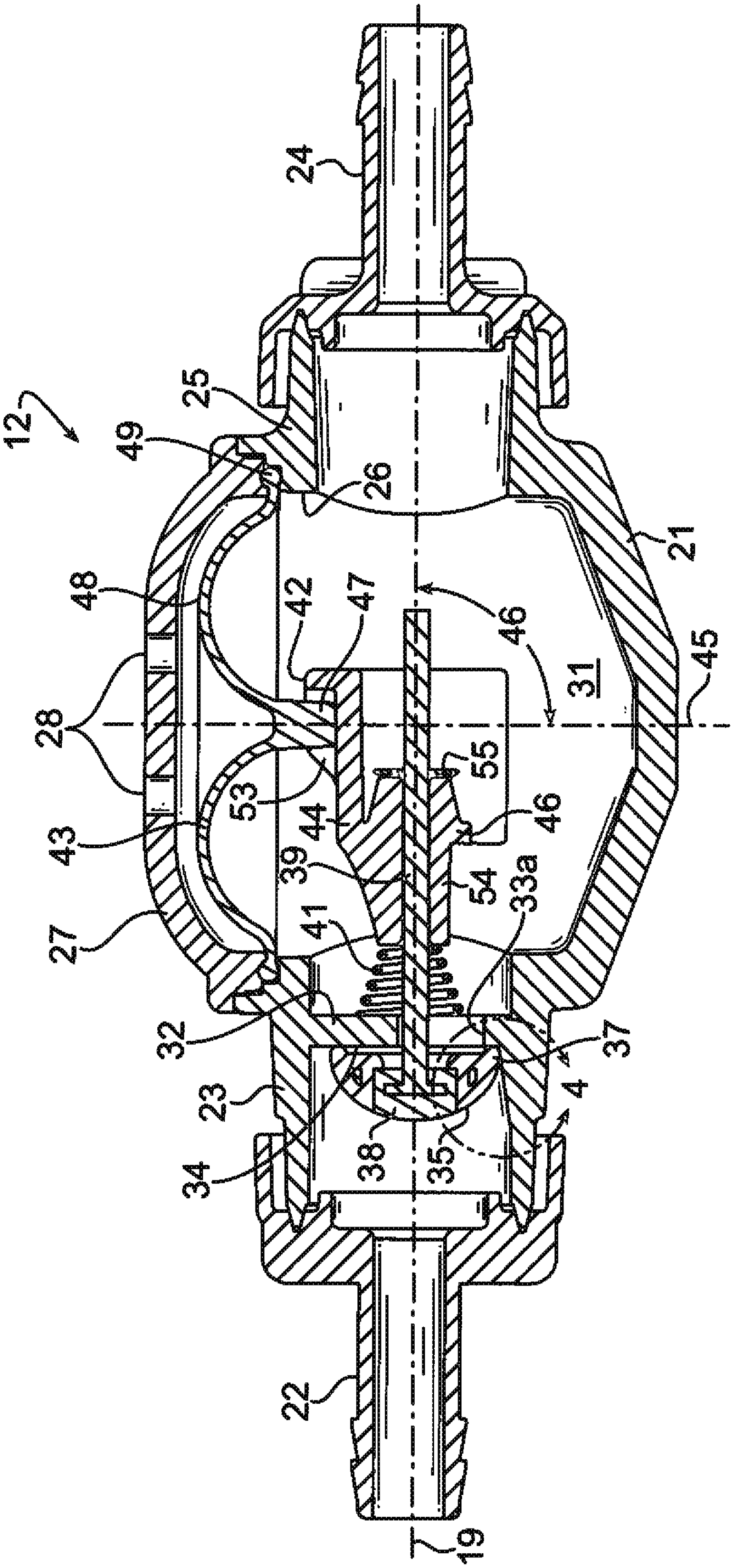
FIG. 3 illustrates a cross sectional view taken along reference view line 3-3 in FIG. 2, with the demand valve in a first or closed position.
Figure 6:
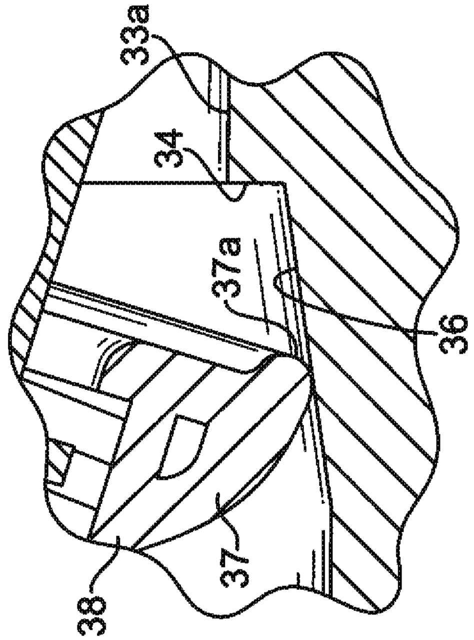
FIG. 6 is an enlarged view of the portion of the demand valve indicated by detail 6 in FIG. 5.
Figure 4:
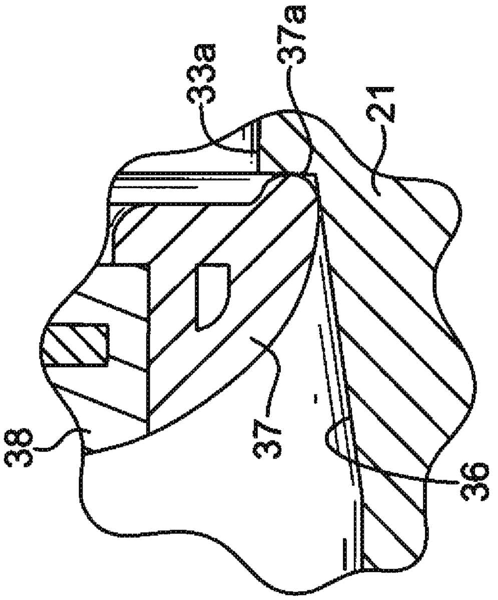
FIG. 4 is an enlarged view of the portion of the demand valve indicated by detail 4 in FIG. 3
Figure 5:
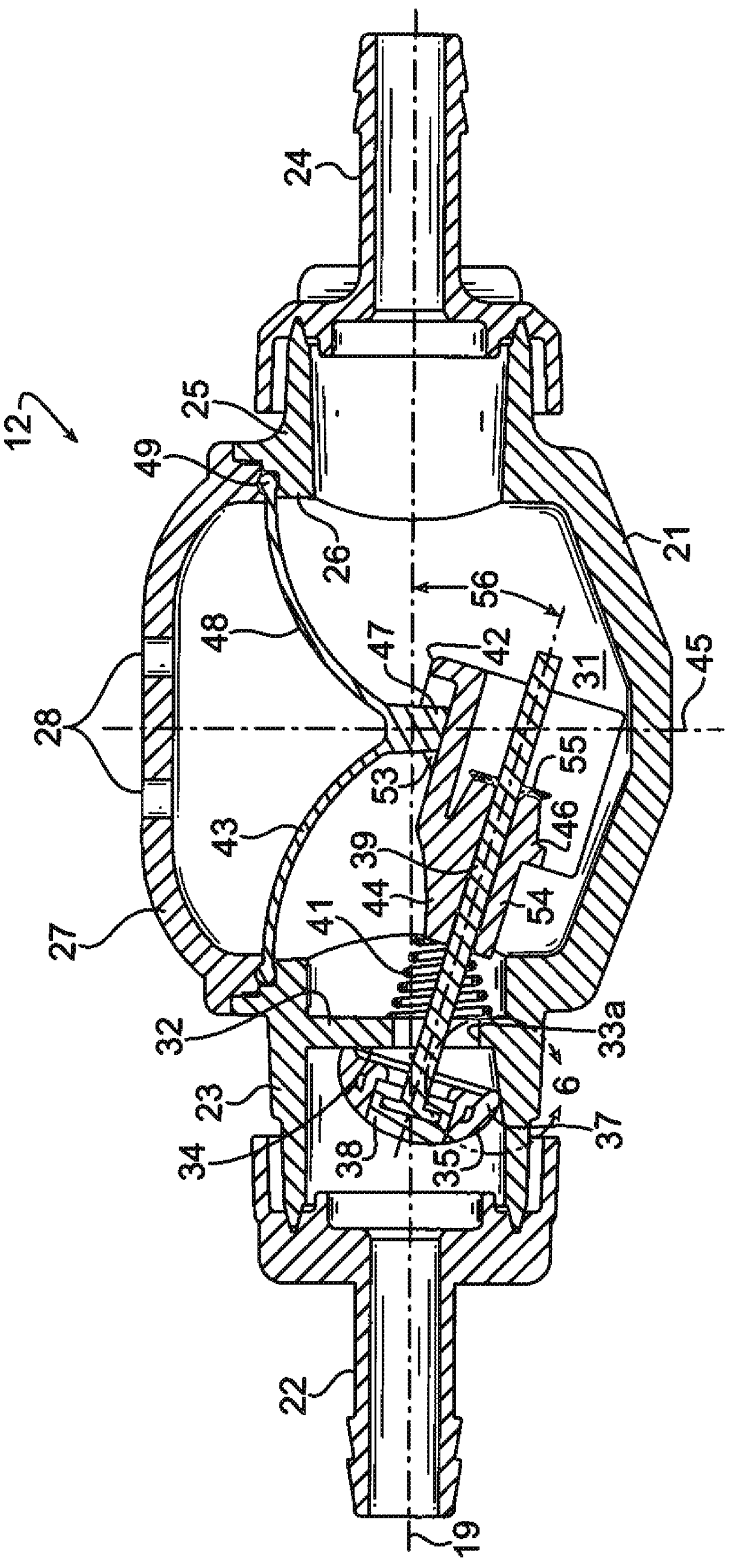
FIG. 5 is a view similar to FIG. 3, but with the demand valve in a second or opened position.
Figure 8:
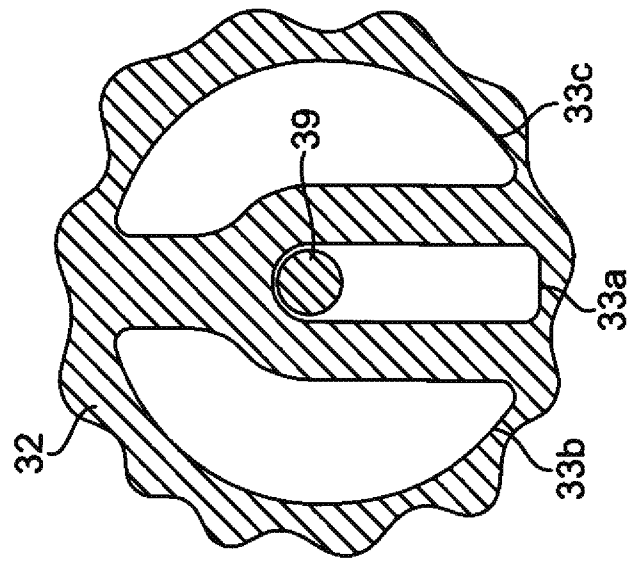
FIG. 8 illustrates a partial cross sectional view taken along reference view line 8-8 in FIG. 2, to illustrate the flow passages through the demand valve.

When the engine 11 is to be started, the primer pump 13 is operated in the manner described above to create a negative pressure or vacuum or reduced pressure in the central chamber 31 of the demand valve 12. As used herein, the term negative pressure means a pressure level that is less than the reference pressure acting through the holes 28 in the closure piece 27. This negative pressure causes a pressure differential across the diaphragm 43, and this pressure differential begins to exert a downward lateral force on the flexible portion 48 and lug 47 of the diaphragm 43. This downward lateral force is transmitted from the diaphragm 43, through the first connecting portion 53 and second connecting portion 54, to the pin 39. This downward lateral force on the pin 39 caused by the negative pressure in the central cavity 32 begins to rotate or tilt the pin 39 and valve member 37 about a lateral axis from the closed position illustrated in FIGS. 3, 4 and 7 toward the opened position illustrated in FIGS. 5 and 6. This tilting movement of the pin 39 is guided by the walls of the slot 33*a*, so that precise alignment of the valve surface 37*a* surrounding the passages 33*a*, 33*b* and 33*c* is maintained as the valve member 37 moves toward and away from its closed position. Because this lateral force on the pin 39 acts near an end of the pin 39 a substantial distance away from the valve member 37, the pin 39 provides a lever arm that increases tilting or rotating force acting on the valve member 37 to unseat the valve member 37 from the valve seat 34. Further, since the entire effective area of the valve member 37 is not displaced in a longitudinal direction against any pressure in the fuel tank 11 and fuel line 15, unseating the valve member 37 is facilitated. As the valve member 37 unseats from the valve seat 34, fuel begins to flow from the fuel tank 11 and fuel line 15, through the demand valve 12 and fuel line 16 and primer pump 13 and fuel line 17, to the engine 14. Once the engine 14 is running, the vacuum condition on the intake side of the engine 14 creates a continuing negative pressure in the central cavity 31 to maintain a continuing pressure differential across the diaphragm 43. This pressure differential causes the diaphragm 43 to maintain a downward lateral force against the connector 44, to retain the connector 44 and pin 39 and valve member 37 in their tilted or rotated or opened positions illustrated in FIG. 5 and allows fuel to continue to flow to the engine 14 as the engine 14 continues to run. The lateral tilting movement of the connector 44 and pin 39 and valve member 37 is limited by engagement of the connector 44 with the surface of the cavity 31 is shown in FIG. 3. In this opened position, the longitudinal axes of the valve member 37 and pin 39 are no longer coaxial with or parallel to the longitudinal axis 19 and instead are non-parallel and at an included angle 56 (FIG. 5) of greater than about 10 degrees and less than about 60 degrees and preferably about 30 degrees. Further, in this opened position, the tilted valve member 37 is at least partially spaced from, and preferably partially spaced from and partially engaging, the valve seat 34. When the engine 14 is turned off, the negative pressure on the intake side of the engine 14 is reduced to reference pressure and the pressure in the central cavity 31 on the bottom of the diaphragm 43 becomes substantially equal to the pressure on the top of the diaphragm 43. This allows the spring 41 to tilt or rotate the valve member 37 and pin 39 and connector 44 and diaphragm 43 back to the closed positions illustrated in FIGS. 3, 4 and 7, to again prevent fuel and/or fuel vapor flow through the demand valve 12 and potential escape to the environment when the engine 11 is not running. During this closing movement, the tapered or coned shaped housing portion 36 guides the valve member 37 to its closed position. Also, during this tilting movement, the slot 33*a* maintains precise alignment of the valve surface 37*a* surrounding all of the passages 33*a*, 33*b* and 33*c*. Further, during the tilting movement of the connector 44 to open and close valve member 37, substantially parallel walls 57 and 58 of connector 44 slide against adjoining parallel walls 59 and 60 of valve housing 21 (FIG. 7) to guide the movement of the connector 44 and prevent rotation of the connector 44 or disengagement of the lug 47 from the connector 44.

A presently preferred embodiment of the invention is shown in the drawings and described in detail above. The invention is not, however, limited to this specific embodiment. Various changes and modifications can be made to this invention without departing from its teachings, and the scope of this invention is defined by the claims set out below. Also, while terms such as first and second, one and another, top and bottom are used to more clearly describe the structure and operation of the specific embodiment of the invention, it should be understood these terms are used for purposes of clarity and may be interchanged as appropriate. Further, separate components illustrated in the drawings may be combined into a single component, and single components may be provided as multiple parts.

What is claimed is:

1. A valve comprising a valve body, a passage located within the valve body, a valve seat and a valve member disposed in the passage, the valve member being arranged for tilting movement relative to the valve seat to open and close the passage, a valve member actuator disposed in the passage for tilting the valve member, the actuator including a flexible diaphragm movable in response to a fluid pressure differential on opposite sides of the diaphragm and a connector, and the connector including one connector portion connected to the diaphragm and another connector portion connected to the valve member, wherein the other connector portion is slidably connected to the valve member.

2. A valve as set forth in claim 1, wherein the valve seat has a longitudinal valve seat axis, the valve member has a longitudinal valve member axis, the valve member has a first valve member position engaging the valve seat to close the passage, and the valve member has a second valve member position at least partially spaced from the valve seat by tilting movement to open the passage.

3. A valve as set forth in claim 1, wherein the one connector portion is pivotally connected to the diaphragm.

4. A valve as set forth in claim 1, wherein the diaphragm includes a central lug, the one connector portion is pivotally and slidably connected to the diaphragm lug, and the one connector portion includes cooperating walls defining a longitudinally extending slot in which the diaphragm lug is slidably disposed.

5. A valve as set forth in claim 1, wherein the valve member includes an elongated pin, and the other connector portion includes a hole in which the pin is slidably disposed.

6. A valve as set forth in claim 1, wherein the passage includes a slot shaped opening, the valve member includes an elongated pin extending through the opening, and the lateral cross sectional area of the slot shaped opening is at least three times the lateral cross sectional area of the pin, whereby substantial fluid flow through the slot shaped opening is not blocked by the pin.

7. A valve as set forth in claim 1, wherein the valve body and the connector include cooperating adjoining walls that slidably engage one another to guide movement of the connector as the connector opens and closes the valve member.

8. A valve as set forth in claim 1, in combination with a liquid fuel tank and a primer pump, the valve being located between the fuel tank and the primer pump.

9. A valve comprising a valve body, a passage located within the valve body, a valve seat and a valve member disposed in the passage, the valve member being arranged for tilting movement relative to the valve seat to open and close the passage, a valve member actuator disposed in the passage for tilting the valve member, the actuator including a flexible diaphragm movable in response to a fluid pressure differential on opposite sides of the diaphragm and a connector, and the connector including one connector portion connected to the diaphragm and another connector portion connected to the valve member, wherein the passage includes a slot shaped opening, the valve member includes an elongated pin extending through the opening, and the lateral cross sectional area of the slot shaped opening is at least three times the lateral cross sectional area of the pin, whereby substantial fluid flow through the slot shaped opening is not blocked by the pin, and wherein the passage includes at least one additional passage on at least one lateral side of the pin, and the valve member includes a valve surface surrounding the slot shaped passage and the additional passage when the valve member is in a closed position.

10. A valve as set forth in claim 9, wherein the at least one additional passage includes an additional passage on each lateral side of the pin, and the valve member includes a valve surface surrounding the slot shaped passage and the additional passages when the valve member is in a closed position.

11. A valve member as set forth in claim 10, wherein each of the additional passages is semi-circular, and the valve surface has a generally circular configuration.

12. A valve member as set forth in claim 11, wherein the lateral cross sectional area of the slot shaped passage and the additional passages in total is greater than about 70 percent of the lateral cross sectional area of the valve surface.

13. A valve comprising a valve body, a passage located within the valve body, a valve seat and a valve member disposed in the passage, the valve member being arranged for tilting movement relative to the valve seat to open and close the passage, a valve member actuator disposed in the passage for tilting the valve member, the actuator including a flexible diaphragm movable in response to a fluid pressure differential on opposite sides of the diaphragm and a connector, and the connector including one connector portion connected to the diaphragm and another connector portion connected to the valve member wherein the one connector portion is movably connected to the diaphragm, the other connector portion is movably connected to the valve member, the valve seat longitudinal axis and the valve member longitudinal axis are substantially parallel when the valve member is in an opened position, and the valve seat longitudinal axis and the valve member longitudinal axis are non-parallel when the valve member is in a closed valve member position.

14. A valve as set forth in claim 11, wherein the included angle between the valve member longitudinal axis and the valve seat longitudinal axis is between about 10 degrees and about 60 degrees when the valve member is in the opened valve member position.

15. A valve as set forth in claim 13, wherein the included angle between the valve member longitudinal axis and the valve seat longitudinal axis is about 30 degrees when the valve member is in the opened valve member position, and the valve member is disposed in a generally coned shaped housing portion to guide tilting movement of the valve member between its closed and opened positions.

* * * * *